(12) United States Patent
Innala

(10) Patent No.: US 7,583,679 B2
(45) Date of Patent: Sep. 1, 2009

(54) NETWORK FOR DATA TRANSFER

(75) Inventor: Kari Innala, Itäsalmi (FI)

(73) Assignee: Fulcrum Laboratories AG, Zug (CH)

( * ) Notice: Subject to any disclaimer, the term of this patent is extended or adjusted under 35 U.S.C. 154(b) by 985 days.

(21) Appl. No.: 10/296,257

(22) PCT Filed: May 14, 2001

(86) PCT No.: PCT/FI01/00462

§ 371 (c)(1), (2), (4) Date: Nov. 21, 2002

(87) PCT Pub. No.: WO01/91392

PCT Pub. Date: Nov. 29, 2001

(65) Prior Publication Data

US 2003/0123458 A1     Jul. 3, 2003

(30) Foreign Application Priority Data

May 26, 2000   (FI) ................................ U20000221

(51) Int. Cl.
*H04L 12/28* (2006.01)
*H04L 12/56* (2006.01)
(52) U.S. Cl. ...................................... 370/400; 370/389
(58) Field of Classification Search ................. 370/351, 370/352–356, 389, 401, 400, 396, 388
See application file for complete search history.

(56) References Cited

U.S. PATENT DOCUMENTS

| 5,381,410 | A | * | 1/1995 | Grenot ........................ 370/352 |
| 5,610,905 | A | * | 3/1997 | Murthy et al. .............. 370/401 |
| 5,619,497 | A | * | 4/1997 | Gallagher et al. ........... 370/394 |
| 6,047,325 | A | | 4/2000 | Jain et al. |
| 2002/0031106 | A1 | * | 3/2002 | Maki et al. .................. 370/337 |
| 2005/0058147 | A1 | * | 3/2005 | Regnier et al. .............. 370/412 |

FOREIGN PATENT DOCUMENTS

| EP | 0 701 347 | 3/1996 |
| JP | 11-242639 | 9/1999 |
| WO | WO 97/18637 | 5/1997 |
| WO | WO 98/56141 | 12/1998 |
| WO | WO 99/48301 | 9/1999 |
| WO | WO 00/29928 | 5/2000 |

* cited by examiner

*Primary Examiner*—Ajit Patel
(74) *Attorney, Agent, or Firm*—Buchanan Ingersoll & Rooney PC

(57) ABSTRACT

The object of the invention is a data transfer network for data transfer and data processing comprising one or more transfer channels (2*a*, 2*b*, 2*c*, 20*a*, 20*b*, 20*c*, 21*a*, 21*b*, 21*c*, 22*a*) and data switches (1*a*, 1*b*, 1*c*, 1*d*, 1*e*) connected to each other by means of these transfer channels (2*a*, 2*b*, 2*c*, 20*a*, 20*b*, 20*c*, 21*a*, 21*b*, 21*c*, 22*a*). All the data switches (1*a*, 1*b*, 1*c*, 1*d*, 1*e*) of the network are fast and intelligent and every one of them can function as a server, a router, and/or as a data switch for the data being transferred in the network.

16 Claims, 2 Drawing Sheets

NETWORK FOR DATA TRANSFER

FIELD OF THE INVENTION

The object of the invention is a data transfer network for data transfer and data processing comprising one or more transfer channels and data switches connected to each other by means of these transfer channels.

BACKGROUND OF THE INVENTION

Usually the data transfer networks comprise terminal devices, servers, routers, and various data switches connected to the transfer channel. The terminal devices are usually intended for receiving information from the network and for presenting it to the user and/or for transmitting the data inputted by the user to the terminal device to the network. The servers are usually used for storing data and/or for processing it. The purpose of the routers is to transmit further the data received from a terminal device or from a server to an upper level router and/or transmit further the data received from an upper level router to a server or to a terminal device. The terminal devices can be connected directly to the servers or the connection is made by using a local area network. The transfer channel between two terminal devices in a data transfer network comprises different wired and wireless transfer channels connected to each other by means of servers, routers, and data switches.

Usually the network is formed to a star or a tree in such a way that the terminal devices are in connection with each other by means of a local area network, servers, and routers. The network can also be formed of star-like parts connected to each other. The connections from one terminal device to another are usually formed by means of servers and routers. Usually the users take a connection with their terminal devices to the server of the service provider by means of the network and the devices thereof The forming of the connection even between two neighboring terminal devices has to be done usually through the server of the service provider, because the service is available generally only on the server of the service provider. This leads easily to the congestion of the network and therefore to the lengthening of the response times. To reduce this disadvantage e.g. in the Internet the so-called proxy-servers are used especially for storing the data used often or most recently. In the terminal devices the corresponding data can be stored in its own intermediate memory. The data stored in this way has not, however, the same content as the corresponding data retrieved from the server and therefore the terminal devices and the servers have to be controlled in such a way that they update the stored data every now and then.

It is characterizing to the known networks also that the servers, routers, and data switches used in them are each dedicated and suitable for performing generally only one for them characteristic function in the network. Further it is characterizing to the known networks that they are controlled and their function is monitored centrally from certain connections dedicated to the control or monitoring.

SUMMARY OF THE INVENTION

It is characterizing to the invention that all the data switches of the network are fast and intelligent and that every one of them can function as servers, routers, and/or generally as data switches for the data transferred in the network. In a preferred embodiment of the data transfer network according to the invention by a fast data switch is meant data switches having a switching time of less than 1 ms for setting up a connection.

In a preferred embodiment of the network according to the invention the data to be transferred and processed consists of transferring in addition to data and control data also transferring data for carrying out different services. Such services can be e.g. telephone connections, television programs, video pictures, video conferencing, Internet-connections or other such services utilizing data communication. These services are connected to the network through interface means in the data switches.

In a preferred embodiment of the invention between two data switches are provided one or more transfer channels to which the data switches are connected through interface means. The data switches preferably are provided with means for recognizing the type of the data coming from the transfer channel and with means for choosing a transfer channel on the basis of the presentation mode and/or the transfer mode of the data transmitted through the data switch. Of the transfer channels between the two data switches can in a preferred embodiment of the invention at least one be a wireless transfer channel. Other transfer channels can be e.g. copper cables, optical fibers, coaxial cables or other corresponding transfer channels suitable for data transfer.

The network according to the invention is provided preferably with one or more transfer channels between the data switches depending on the sort of the data to be transferred and/or the service provided, on the protocols used in the data transfer and on the amount of the data transferred.

In a preferred embodiment of the invention the data switch is also provided with means for selecting a transfer channel of several possible transfer channels between the data switches preferably e.g. based on the loading of the transfer channels or on another control data transmitted to the data switch and/or generated on the basis of the control data by using the means of the data switch.

In a preferred embodiment of the invention the data switches are connected to each other one after another so that they form a chain in which every data switch is connected to at most two other data switches. In another preferred embodiment of the invention in the network at least one data switch is connected to more than two other data switches preferably e.g. for creating a backup connection between the data switches of the network. Still in another preferred embodiment of the invention two or more data switches can be connected in parallel for securing the switching operation.

In a data transfer network according to the invention it is possible to connect directly at least one terminal device to at least one data switch. These connectable terminal devices are preferably e.g. printers, display terminal devices, workstations, or other terminal devices intended for the use of the user. In a preferred embodiment of the invention to every data switch of the network can be connected at least one terminal device intended for the user. The terminal device is connected to the data switch in a preferred embodiment of the invention by using interfacing means either in the terminal device or in the data switch.

In another data transfer network according to the invention it is possible to connect to at least one data switch at least one local area network, for which network the said data switch acts as a server. The local area network and the data switch are connected to each other by using suitable interfacing means. In a preferred embodiment of the invention it is possible to connect to every data switch of the network at least one local area network. The said local area network is provided preferably with one or several terminal devices.

In a preferred embodiment of the network according to the invention the data switches of the network are provided with interfacing means for interfacing the transfer protocols used in the network and/or in the terminal devices and/or in the local area network to each other.

It is characterizing to the network according to the invention that the data switches of the network are provided with means for having preferably a continuous connection with each other through the network for sensing the state of the network.

Further it is characterizing to the invention that every data switch of the network is provided with means for identifying, controlling, and/or steering the state of the input and output ports of this data switch and with means for transmitting the data describing these states to at least one other data switch of the network. Every data switch is also provided with means for transmitting further the data describing the states of the input and output ports of the other switches connected to data switch to at least one other data switch of the network In a preferred embodiment of the invention the data switch transmits of the data describing the states of its input and output ports and/or of the corresponding data of the other data switches received by it only the data defined to be deviating. The data switches are preferably provided with means for comparing the data describing the states of these ports to values defined in advance or to values received by the data switch through the network. In a preferred embodiment of the invention to any data switch in the network can be connected means for following the state of the network and the state of the chosen data switches of the network.

In a preferred embodiment of the invention for controlling the operation of the data switch of the network in addition to the data contained by the data switch also the data sent by a terminal device in connection with the network and/or the data included in the data received by the data switch are used. In a preferred embodiment of the invention the data switch is provided with means for combining the data sent to the data switch, and/or the data intended to be transmitted further, and the data contained in the data switch for controlling the operation of the data switch. In another preferred embodiment of the invention the data switch is provided with means for composing data for controlling the operation of at least another data switch on the basis of the data contained in the first data switch, the data sent to the first data switch and the data transmitted further by the first data switch and with means for transmitting the data so composed and intended to be used for controlling another data switch either as a separate control data or by combining the said control data to a data to be transmitted further.

According to a preferred embodiment of the invention the operation of the data switches can be controlled on the basis of the data transmitted by them preferably e.g. in such a way that the data switch in receiving packaged or zipped data in order to transmit it further and in observing that the next data switch will transmit the data received further in packaged or zipped form, transmits further the packaged data received by it without unpackaging or unzipping it.

According to a preferred embodiment of the invention the data switch of the network generates a data transfer connection between a terminal device or terminal devices connected to this data switch, and/or a local area network connected to this data switch, or one or more terminal devices connected to local area networks connected to this data switch and another data switch of the network for transmitting the data or control data transmitted by this second data switch to the first data switch and/or to a terminal device connected to it. In this preferred embodiment of the invention the terminal device is connected to the data, control data and/or service needed or demanded by it preferably e.g. to that data switch which is nearest to the terminal device and which uses or transmits further the said data, control data and/or service. In this preferred embodiment it is not necessary to generate a connection up to the data switch or terminal device producing the data, control data and/or service which diminishes the loading of the network and the loading of the terminal device and/or data switch producing data, control data and/or service. In a preferred embodiment of the invention the data switch is provided with means for generating a connection between a terminal device, and/or a local area network connected to it, and/or its terminal device and the data, control data and/or service transmitted further by the data switch.

In a preferred embodiment of the invention one or more data switches are provided with means for editing the data transmitted by it e.g. for encrypting or packaging the data and/or unpacking or deciphering it. The data switches are preferably provided with means, which on the basis of the control data received by the data switch and/or included in the data transmitted further by the data switch bring about the said editing.

Further in another preferred embodiment of the invention one or more of the data switches are provided with means for forming a so-called firewall for controlling the data communication through the data switch and for a possible filtering. Still in a preferred embodiment of the invention at least one data switch is provided with means for detecting data detrimental to the operation of the network, to any means of the network, or to any means connected to it, such as data viruses, and means for preventing the further transmitting of such data The network according to the invention is suitable preferably e.g. for an internal network of a company or corresponding unit (intranet), for a network between two or more companies or corresponding units (extranet), for a common data transfer network, or for a combination of some or all of them.

BRIEF DESCRIPTION OF THE DRAWINGS

The invention is described in more detail by referring to the accompanying drawings in which.

In the figures like reference numbers are used for like parts.

DESCRIPTION OF THE PREFERRED EMBODIMENTS

Figure 1:
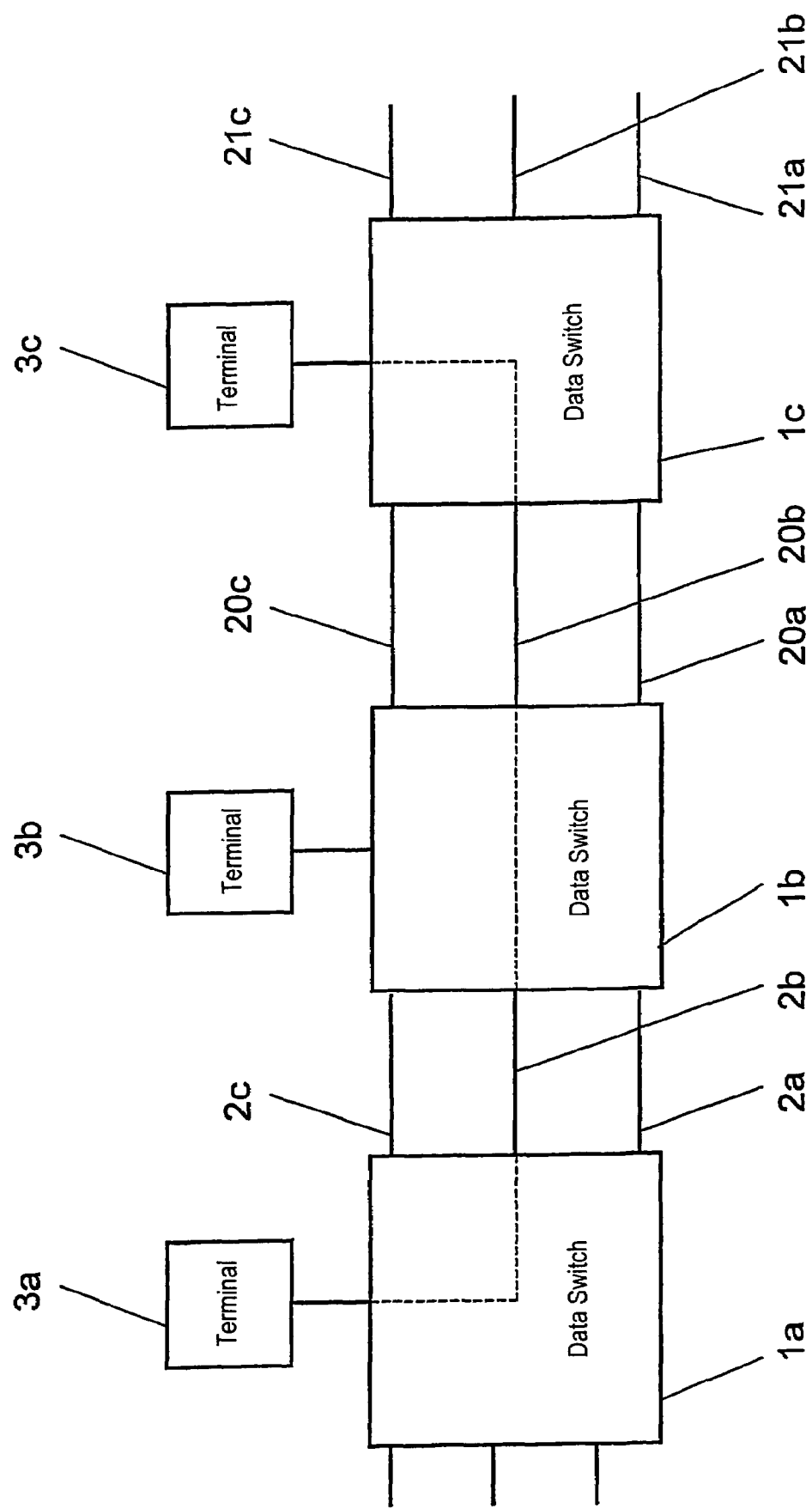
FIG. 1 shows a principal illustration of a part of the data transfer network according to the invention and FIG. 2 shows another example of a part of the network according to the invention.
Figure 2:
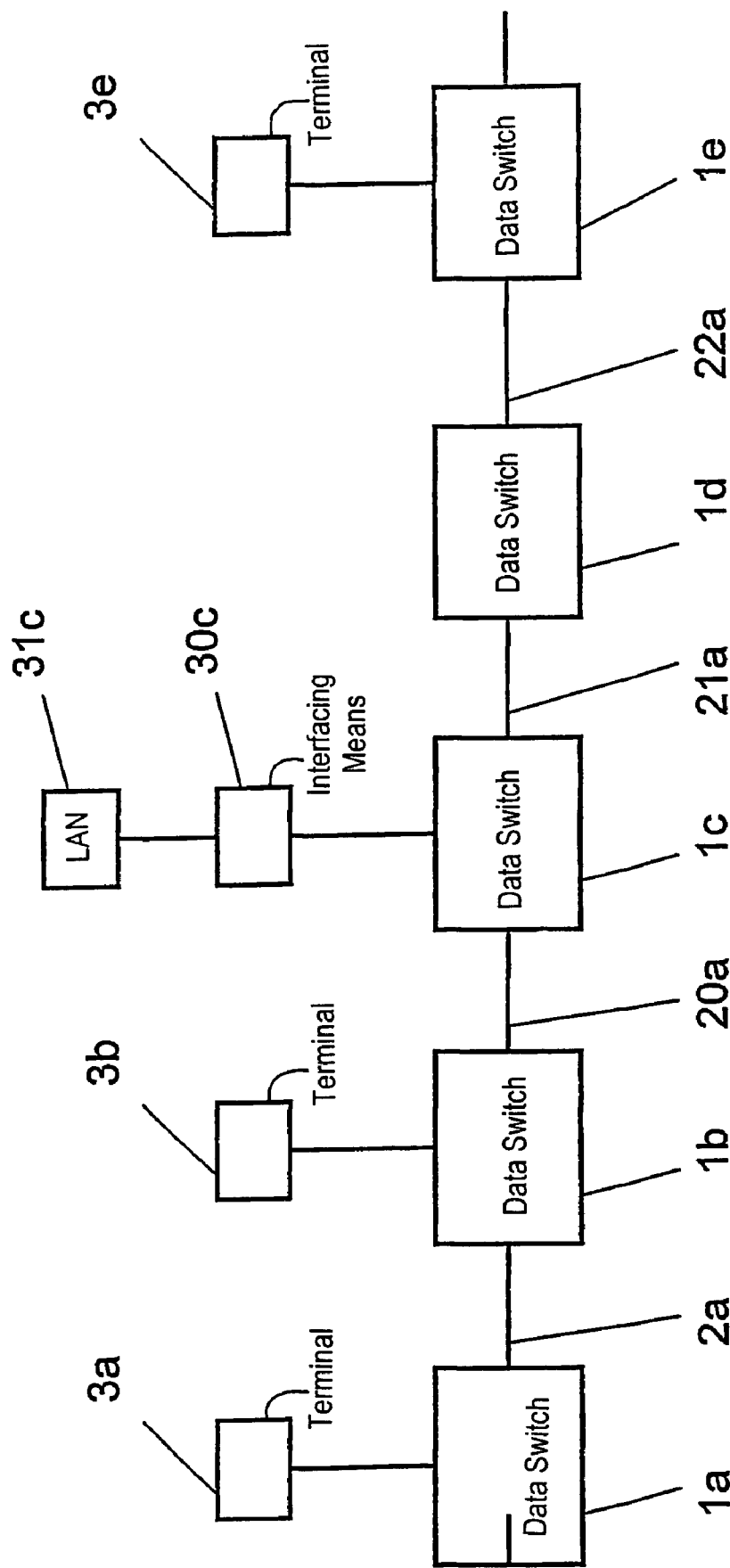

In FIG. 1 the data switches of the data transfer system are referenced by reference numbers 1a, 1b, and 1c and with reference numbers 2a, 2b, and 2c the transfer channels between the data switches 1a and 1b, which transfer channels are connected with interfacing means to the data switches 1a and 1b. The interfacing means in the data switches 1a, 1b, and 1c make possible in a preferred embodiment of the invention both the transmitting and the receiving of the data. To the data switch 1a is connected a terminal device 3a having means for connecting the terminal device 3a to the data switch 1a for transmitting and/or receiving data The data switch 1a is provided with means for connecting the terminal device to the transfer channel 2b of the data transfer network. The data switch 1b is also provided with means for connecting the data coming from the transfer channel 2b to the data switch 1b and for further transmitting the data through the data switch 1b to the transfer channel 20b. The corresponding arrangement is also in the data switch 1c for further connecting the data coming from the transfer channel 20b to the transfer channel 21b. The transfer channel 20b is connected to the data switch 1c with the interfacing means in the data switch 1c. The terminal device 3c is connected with interfacing means to the data switch 1c and through the data switch 1c to the transfer channel 20b for transmitting and/or receiving data. In this way between the terminal devices 3a and 3c is formed a data transfer connection which is two-way in a preferred embodiment of the invention. The interfacing means in the data switches 1a and 1b interface the data transfer protocols used by the terminal devices 3a and 3c to be conformal with the data transfer protocols used by the transfer channels 2b and 20b. Correspondingly the interfacing means in the data switches 1b and 1c interface the data through these data switches to be conformal with the protocol in the transfer channels 2b, 20b, and 21b. In a preferred embodiment of the invention the same transfer protocol is used in the transfer channels 2b, 20b, and 21b. Still in another preferred embodiment of the invention this protocol is the same that the terminal devices 3a and 3c are using when transmitting and receiving data. In FIG. 2 is illustrated another example of a part of the network according to the invention. In this example the terminal device 3e is a transmitter transmitting a television program to which terminal device a connection from the terminal device 3a has been formed in the way described above through the data switches 1b, 1c, and 1d and through the transfer channels 2a, 20a, 21a, and 22a Between the data switches 1a, 1b, 1c, 1d, and 1e there can be several different transfer channels but for simplicity in this example only one of these has been illustrated. If this program is desired to be watched from the terminal device 3b connected to the data switch 1b, it is not necessary in a data transfer network according to the invention to generate a new connection through the data switches 1b, 1c, and 1d from the terminal device 3b to the terminal device 3e, but in the data switch 1b, a connection can be formed from the terminal device 3b to the data stream incorporating the television program passing through the data switch 1b. In a corresponding way can be proceeded if the terminal device 3e is e.g. an Internet server to which from both the terminal device 3a and the terminal device 3b a connection is desired to be formed. The data switch 1b detects that such data is transferred through it which the terminal device 3b connected to this data switch 1b is asking. The connection from the terminal device 3b to this service provided by the terminal device 3e is formed in the data switch 1b that diminishes both the loading of the network and the loading of the terminal device providing the service, in the example the loading of the terminal device 3e.

In FIG. 2 a local area network 31c is connected to the data switch 1c with suitable interfacing means 30c to which local area network several terminal devices can be connected. From the terminal devices of this local area network 31c and the terminal devices connected to it a connection through the data switch 1c can be formed to any service connected to the network in the way described above.

The invention claimed is:

1. A data transfer network for data transfer and processing comprising:
   one or more transfer channels; and
   a plurality of data switches connected to each other by means of the transfer channels, wherein every data switch of the network functions as a server, a router, and/or a data switch for the data to be transferred in the network, and
   wherein each of the data switches comprises means for recognizing a type of data in a data packet to be transferred from one of the transfer channels connected to the data switch, means for selecting one or more of the transfer channels connected to the data switch to which the data packet will be transferred based on the type of the data recognized in the data packet, means for composing data for controlling operation of at least another data switch on the basis of data contained in a first data switch, data sent to the first data switch and data transmitted by the first data switch, and means for transmitting the composed data intended to be used for controlling the another data switch either as a separate control data or by combining the composed data to a data to be transmitted further;
   wherein at least one of the data switches is provided with means for detecting continuously state of input and/or output ports of the at least one of the data switches; and
   wherein at least one of the data switches is provided with means for continuously detecting state of the network on the basis of states of the data switches and states of input and/or output ports of the data switches.

2. A network according to claim 1, wherein at least one data switch of the network is connected by means of one or more transfer channels to at most two other data switches of the network.

3. A network according to claim 1, wherein every data switch is provided with means for connecting at least one terminal device to the network by means of the data switch.

4. A network according to claim 1, wherein every data switch is provided with means for connecting at least one local area network to the network by means of the data switch.

5. A network according to claim 4, wherein the data switch is provided with means for transmitting the data describing the state of the input and/or output ports of the data switch to at least one other data switch of the network.

6. A network according to claim 4, wherein at least one data switch is provided with means for continuously detecting the state of the network on the basis of the states of the data switches and the states of their input and/or output ports.

7. A network according to claim 5, wherein at least one data switch is provided with means for controlling at least one other data switch of the network on the basis of the states of the data switches of the network and the states of their input and/or output ports.

8. A network according to claim 1, wherein the data switches of the network control the transfer of data in the network, which data is simultaneously transferred in the network and complies to several different data transfer protocols.

9. A network according to claim 1, wherein the network is provided with at least one data switch for forming a connection from a terminal device connected to it and/or from a local area network connected to it and/or from a terminal device of the local area network connected to it to any data, control data, or service transferred through this data switch at every time.

10. A network according to claim 2, wherein the network is provided with at least one data switch for forming a connection from a terminal device connected to it and/or from a local area network connected to it and/or from a terminal device of the local area network connected to it to any data, control data, or service transferred through this data switch at every time.

11. A network according to claim 3, wherein the network is provided with at least one data switch for forming a connection from a terminal device connected to it and/or from a local area network connected to it and/or from a terminal device of the local area network connected to it to any data, control data, or service transferred through this data switch at every time.

12. A network according to claim 4, wherein the network is provided with at least one data switch for forming a connection from a terminal device connected to it and/or from a local area network connected to it and/or from a terminal device of the local area network connected to it to any data, control data, or service transferred through this data switch at every time.

13. A network according to claim 1, wherein the network is provided with at least one data switch for forming a connection from a terminal device connected to it and/or from a local area network connected to it and/or from a terminal device of the local area network connected to it to any data, control data, or service transferred through this data switch at every time.

14. A network according to claim 5, wherein the network is provided with at least one data switch for forming a connection from a terminal device connected to it and/or from a local area network connected to it and/or from a terminal device of the local area network connected to it to any data, control data, or service transferred through this data switch at every time.

15. A network according to claim 1, wherein one or more of the data switches is provided with means for editing the data packet transmitted by it.

16. A data transfer network for data transfer and processing comprising:

one or more transfer channels; and a plurality of data switches connected to each other by means of the transfer channels, wherein each of the data switches functions as a server, a router, and/or a data switch for the data to be transferred in the network, wherein each of the data switches comprises means for composing data for controlling operation of at least another data switch on the basis of data contained in a first data switch, data sent to the first data switch and data transmitted by the first data switch, and means for transmitting the composed data intended to be used for controlling the another data switch either as a separate control data or by combining the composed data to a data to be transmitted further wherein at least one of the data switches forms a connection from a terminal device connected to the data switch and/or from a local area network connected to the data switch and/or from a terminal device of the local area network connected to the data switch to a service being transferred in a data stream through the data switch; wherein at least one of the data switches is provided with means for detecting continuously state of input and/or output ports of the at least one of the data switches; and wherein at least one of the data switches is provided with means for continuously detecting state of the network on the basis of states of the data switches and states of input and/or output ports of the data switches.

* * * * *

UNITED STATES PATENT AND TRADEMARK OFFICE
CERTIFICATE OF CORRECTION

PATENT NO. : 7,583,679 B2  Page 1 of 1
APPLICATION NO. : 10/296257
DATED : September 1, 2009
INVENTOR(S) : Kari Innala It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1301 days.

Signed and Sealed this

Fourteenth Day of September, 2010

David J. Kappos
*Director of the United States Patent and Trademark Office*